United States Patent [19]

Rathfon, II et al.

[11] Patent Number: 4,473,215
[45] Date of Patent: Sep. 25, 1984

[54] CONTROL APPARATUS FOR MOLDING PRESSES

[75] Inventors: John M. Rathfon, II, Selinsgrove, Pa.; Myles N. Murray, Chagrin Falls, Ohio

[73] Assignee: Industrial Electronic Rubber Company, Twinsburg, Ohio

[21] Appl. No.: 338,854

[22] Filed: Jan. 12, 1982

[51] Int. Cl.³ .......................... B29C 3/06; B29F 1/06
[52] U.S. Cl. .................................. 264/40.5; 364/476; 425/149
[58] Field of Search .................. 425/29, 30, 135, 149, 425/150, 156, 157, 167, 140; 264/40.5; 364/476, 477; 73/805, 806, 807; 100/43

[56] References Cited

U.S. PATENT DOCUMENTS

| | | | |
|---|---|---|---|
| 2,067,401 | 1/1937 | Lassman | 425/149 X |
| 2,222,732 | 11/1940 | Winegar | 425/149 |
| 2,330,319 | 9/1943 | Tornberg | 18/17 |
| 2,348,197 | 5/1944 | Ernst et al. | 425/149 X |
| 2,367,242 | 1/1945 | Stacy | 425/149 |
| 2,381,125 | 8/1945 | Hermann | 18/16 |
| 2,557,014 | 6/1951 | Sklarsky | 18/17 |
| 2,567,715 | 9/1951 | Keusch et al. | 18/16 |
| 2,588,662 | 3/1952 | Sayre | 18/16 |
| 2,606,610 | 8/1952 | Collier | 161/7 |
| 3,044,389 | 7/1962 | Rexford | 425/167 |
| 3,174,298 | 3/1965 | Kleiss | 364/477 |
| 3,339,227 | 9/1967 | Ehrenfreund | 425/144 |
| 3,487,507 | 1/1970 | Turk | 425/29 |
| 3,597,794 | 8/1971 | Mann | 425/140 |
| 3,628,901 | 12/1971 | Paulson | 425/149 |
| 3,642,402 | 2/1972 | Hutchinson et al. | 425/144 |
| 3,654,444 | 4/1972 | Gurdl | 364/476 |
| 3,659,974 | 5/1972 | Neugroschl | 425/29 |
| 3,693,946 | 9/1972 | Merritt | 425/167 |
| 3,732,047 | 5/1973 | Kostur | 425/29 X |
| 3,734,663 | 5/1973 | Hohn | 425/149 X |
| 3,799,719 | 3/1974 | Bonikowski et al. | 425/149 |
| 3,819,919 | 6/1974 | Smith | 425/29 X |
| 3,840,312 | 10/1974 | Paulson et al. | 425/149 |
| 3,850,559 | 11/1974 | Mintz et al. | 425/144 |
| 3,859,400 | 1/1975 | Ma | 264/40.5 |
| 3,860,801 | 1/1975 | Hunkar | 425/144 |
| 3,965,744 | 6/1976 | Gutjahr | 425/149 X |
| 4,017,569 | 4/1977 | Hass | 425/149 X |
| 4,022,555 | 5/1977 | Smith | 425/157 X |
| 4,030,868 | 6/1977 | Williams | 264/40.4 |
| 4,060,362 | 11/1977 | Wilson | 425/149 |
| 4,066,725 | 1/1978 | Boetner | 264/40.5 |
| 4,100,598 | 7/1978 | Stiel et al. | 425/149 X |
| 4,208,176 | 6/1980 | Salerno | 364/476 |
| 4,274,823 | 6/1981 | Stanciu et al. | 425/149 |
| 4,344,142 | 8/1982 | Diehr et al. | 425/144 X |
| 4,356,763 | 11/1982 | Hagström | 425/167 |
| 4,365,547 | 12/1982 | McClure | 100/43 |

OTHER PUBLICATIONS

Oliver, Practical Instrumentation Transducers, Hayden, (New York), 1971, pp. 151–153.

Primary Examiner—Willard E. Hoag
Attorney, Agent, or Firm—Maky, Renner, Otto & Boisselle

[57] ABSTRACT

A control apparatus provides for automatic programmed sequencing of pressure bumps at precisely determined pressures in a molding press and optionally provides for full pressure or low pressure cure at the conclusion of the bumping operation. The control apparatus comprises a press pressure monitor that measures press clamp pressure and produces an output signal indicative of the measured press pressure, and a control circuit that compares the output signal with a program selected one of a number of reference signals respectively indicative of bump pressures at which a bump may be desired and directs the press to perform a bump upon a predetermined relationship between the output signal and reference signal, such being indicative of the attainment of the bump pressure indicated by the then selected reference signal. Upon completion of the bumping operation, either full or low pressure cure may be effected. For full pressure cure, the control circuit permits press clamp pressure to increase to full pressure which is then maintained during cure. For low pressure cure, the control circuit compares the output voltage of the press pressure monitor to a program selected reference signal indicative of the desired cure pressure and upon a predetermined relationship therebetween indicative of the attainment of such cure pressure, directs the press to maintain such pressure within a prescribed range.

42 Claims, 2 Drawing Figures

CONTROL APPARATUS FOR MOLDING PRESSES

DISCLOSURE

This invention relates generally to control apparatus for molding machines utilized in molding and curing rubber, synthetic rubber, plastic materials and like materials. More particularly, the invention relates to a control apparatus for effecting automatic sequencing of bumps in a hydraulic molding press at selected pressures before final closure of the press. In addition, the invention relates to a control apparatus that optionally provides for full pressure cure or low pressure cure at a selected pressure in the press.

BACKGROUND OF THE INVENTION

In the operation of molding presses for certain materials such as rubber, it is desirable to subject the press mold to repeated, alternate application and release of pressure in order to allow the escape of air and gases that may have become entrapped in the mold or to permit a rearrangement of the material in the mold. This repeated, alternate application and release of pressure is commonly referred to as "bumping", each "bump" being obtained by reducing the press clamp pressure for a short interval to allow the air and gases to blow their way out of the mold or by actually opening slightly the mold to create a slight gap through which the air and gases may escape. If the air and gases are not allowed to escape, surface blemishes on the molded part or other irregularities may occur and result in scrapping of the defective part.

Preferably, a plurality of bumps are performed in accordance with a prescribed sequence before final closure of the press and application of cure pressure in order to ensure expulsion of all entrapped air and gas and to progressively work the material into the mold cavity or cavities, this being particularly important where the mold cavity or cavities contain complex contours. Typically, the bumps are performed at progressively greater pressure during closing of the mold. However, the pressures at which the bumps are performed and the total number of bumps to be performed may vary from job to job depending, for example, on the viscosity of the particular rubber compound used and the contour of the mold cavity or cavities. It has been found that the proper bumping operation with some rubber compounds is highly dependent on the rubber viscosity in that it affects the degree to which the rubber fills the mold cavity or cavities at any given pressure.

Heretofore, such bumping of the press has been manually accomplished by the press operator merely releasing or dumping the hydraulic pressure to the press ram which in turn releases the clamp pressure acting upon the mold. After a short interval, the press operator would again apply hydraulic pressure to the press ram until a next bump is to be performed. As is often desired, the press operator would dump pressure at progressively greater pressures during closing of the mold, the material being further worked into the mold cavity by each progressively greater pressure. In order to accomplish this, the press operator would watch a pressure gauge to determine when to dump pressure, i.e., to effect a bump.

This procedure however has several drawbacks. In particular, such procedure is subject to human error and inconsistency. As the desired bumping operation may vary from one job to another, it is not uncommon for the press operator to follow an improper bumping sequence. Further inconsistencies occur as a result of shift changes and turn-over of personnel. Moreover, the reaction time of the press operator will not allow for precise repeatability. Accordingly, there is no assurance of repetition of the same procedure for each press cycle, and this all leads to high scrap rates.

Still another drawback of such procedure is that in a production environment the operator may have to prepare for his next run immediately upon closing the mold in the press. It is likely that in trying to perform next run preparations in addition to bumping the press, the operator will miss the proper pressure at which trapped air and gas should be released. Of course, the operator could concentrate solely on the bumping operation and upon its completion turn his attention to next run preparations, but this would cause lost production time. If he could be freed of the bumping task, he could immediately turn to next run preparations and/or perform another task or tasks thereby resulting in increased productivity.

Control apparatus for effecting automatic bumping of a press are known. However, such control apparatus either bump the press at specified time intervals after the press is closed, at specified degrees of closure or only at a single pressure for a selected period of time. In those control apparatus which bump the press at specified degrees of closure, it has been difficult to set the mechanical control elements thereof to obtain a specific relation between cavity pressure and the bump. Even if the proper pressure-distance relationship could be precisely set, any change in rubber viscosity would require recalibration of the distance oriented control elements. That is, as rubber viscosity changes, the amount of press travel to reach a specified pressure will also change.

In those control apparatus which bump the press at specified time intervals, there again is generally no specific relation between cavity pressure and the pump nor is there any compensation for viscosity changes. Because of rubber viscosity variances, the point in time at which a specific pressure will be reached will change. Moreover, the repeatability of such apparatus is disadvantageously affected, for example, by variations in the power supply to the timers employed therein as well as press hydraulic fluid viscosity changes due to the accumulation of heat therein which vary the speed of the press.

A control apparatus which bumps the press a number of times at the same pressure for a selected period of time is disclosed in U.S. Pat. No. 2,367,242. Such apparatus however does not provide for controlled sequential bumping of the press at different pressures.

Once the bumping operation is completed and the press is finally closed, typically full pressure is applied to the mold parts during heating and curing of the material therein. This however may result in a development of substantial residual stress in the molded part because the thermal expansion forces generated by the material as it heats up cannot overcome the press clamp pressure acting on the mold parts. With some materials, this may result in the formation of fractures in the rubber at the parting line of the mold. The formation of such fractures in this manner is commonly referred to as "back rinding".

For those materials that are subject to back rinding, it is desirable to cure same at low pressure. As a result, the mold parts can yield slightly to the thermal expansion forces of the material and thus prevent back rinding. However, relatively high pressure desirably must first be applied to the mold parts to obtain complete filling of the mold cavity or cavities and exhausting of excess material such as by extrusion at the mold part line. Accordingly, it would be desirable to bump the press at progressively greater pressures up to a high pressure and then set back the pressure to a desired low pressure for cure.

SUMMARY OF THE INVENTION

A control apparatus according to the present invention provides for automatic programmed sequencing of pressure bumps at precisely determined pressures in a molding press rather than at approximations of desired bump pressures. In addition, the apparatus optionally provides for full pressure or low pressure cure at the conclusion of the bumping operation.

Briefly, the control apparatus comprises a press pressure monitor that measures press clamp pressure and produces an output signal indicative of the measured press pressure, and a control circuit that compares the output signal with a program selected one of a number of reference signals respectively indicative of bump pressures at which a bump may be desired and directs the press to perform a bump upon a predetermined relationship between the output signal and reference signal, such being indicative of the attainment of the bump pressure indicated by the then selected reference signal. Upon completion of the bumping operation, either full or low pressure cure may be effected. For full pressure cure, the control circuit permits press clamp pressure to increase to full pressure which is then maintained during cure. For low pressure cure, the control circuit compares the output voltage of the press pressure monitor to a program selected reference signal indicative of the desired cure pressure and upon a predetermined relationship therebetween indicative of the attainment of such cure pressure, directs the press to maintain such pressure within a prescribed range.

The control apparatus is controlled by a program which specifies the respective pressures at which sequential bumps are to be performed or, more accurately, the corresponding reference signals with which the output signal of the press pressure monitor is sequentially compared. The program further may specify the total number of bumps to be performed, the desired cure pressure option, and for low pressure cure, the reference signal indicative of the desired low cure pressure.

Preferably, the program for a particular molding job is entered into a non-volatile memory device such as a printed circuit card or the like and a suitable program reader may be provided to decipher the program encoded in the printed circuit card and to enter command signals into the control apparatus that dictate the reference signal to be selected for each bump. Permanent recording of the program in a printed circuit card permits a separate card to be made up and kept with each job order. Moreover, the program is not subject to loss in the event of a power failure or improper program selection as may occur with other program memory devices such as a random access memory. However, if desired, the apparatus may operate in accordance with one of a selected number of programs stored in a random access memory or other type of memory. A desired program may also be selected for example by a sequenced setting of a plurality of rotary switches, there being provided, for example, a rotary switch for each bump step and a rotary switch for selecting the total number of bumps to be performed. There may also be provided a toggle switch to select the desired cure pressure option.

More particularly, the press pressure monitor of the control apparatus includes a pressure transducer that may be connected in the ram extend hydraulic pressure line of the press. The pressure transducer directly measures the hydraulic ram pressure and produces an analog output signal that is directly proportional to measured pressure and thus the press clamp pressure.

The control circuit of the control apparatus includes an analog comparator and a reference selector. The reference selector selectively supplies reference signals to the reference input of the comparator in accordance with command signals received from the program reader. As the press closes at the start of a press molding cycle or after the performance of the previous bump, the analog output signal of the transducer is compared by the comparator with the then selected one of a number of calibrated reference signals, such then selected reference signal being indicative of the press pressure at which the first or next bump is to be initiated. When the transducer output signal matches or comes to exceed the then selected reference signal indicating attainment of the pressure at which the bump is to be initiated, the comparator produces a control or trigger signal. The control signal is received by logic circuitry which under logic conditions indicating that a bump may be performed, directs the press to initiate a bump, i.e., to open the press. Accordingly, the bumps are initiated at precisely determined pressures rather than at some approximation of the desired bump pressure.

The control circuit also includes a bump duration timer that determines the duration of the bump, i.e., the period of time that the press may continue to open. The bump duration timer may start immediately in response to the control signal from the comparator, but preferably does not begin to measure elapsed time until the press ram pressure drops to a predetermined nominal pressure so as to minimize the difference in press travel between a high pressure bump and a low pressure bump. This is effected by utilizing the control signal from the comparator to switch the comparator reference signal to a nominal reference signal indicative of the nominal pressure. When a match occurs between the output signal of the transducer and the nominal reference signal, the comparator generates a second control or trigger signal which starts the bump duration timer. When the bump duration timer times out, the logic circuitry directs the press to close thus completing the bump operation. As a result, the press will open the same amount regardless of the pressure at which the bump was initiated.

The control circuit further includes a bump step counter that counts the number of bumps that have been performed and provides a signal representative of same to the program reader which supplies the corresponding command signal to the reference selector. The reference selector in turn selects and supplies to the comparator the next reference signal dictated by the then supplied command signal. Accordingly as the press again closes upon completion of a bump, a next selected reference signal specified by the program will have compared thereto the output signal of the transducer. When a match occurs indicating attainment of the pressure at which the next bump is to be initiated, a new bump operation is effected. Additional bumps will continue to be performed in like manner until all the bumps specified by the program have been performed. This is readily ascertained by a bump step comparator which compares the number of bumps counted by the counter to the number specified by the program.

The control apparatus according to the invention also may include a cure option control that upon performance of the last bump, optionally provides for full or low pressure cure. For full pressure cure, the cure option control permits press clamp pressure to increase to full pressure for cure. For low pressure cure, a program selected one of the reference signals indicative of the desired low cure pressure is supplied to and maintained at the reference input of the comparator for comparison with the output signal of the pressure transducer. When a predetermined relationship exists therebetween indicating attainment of the cure pressure, the comparator generates a control signal. The control signal is received by logic elements of the cure option control which are then conditioned to direct the press to maintain the then existing clamp pressure during cure within a prescribed range.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
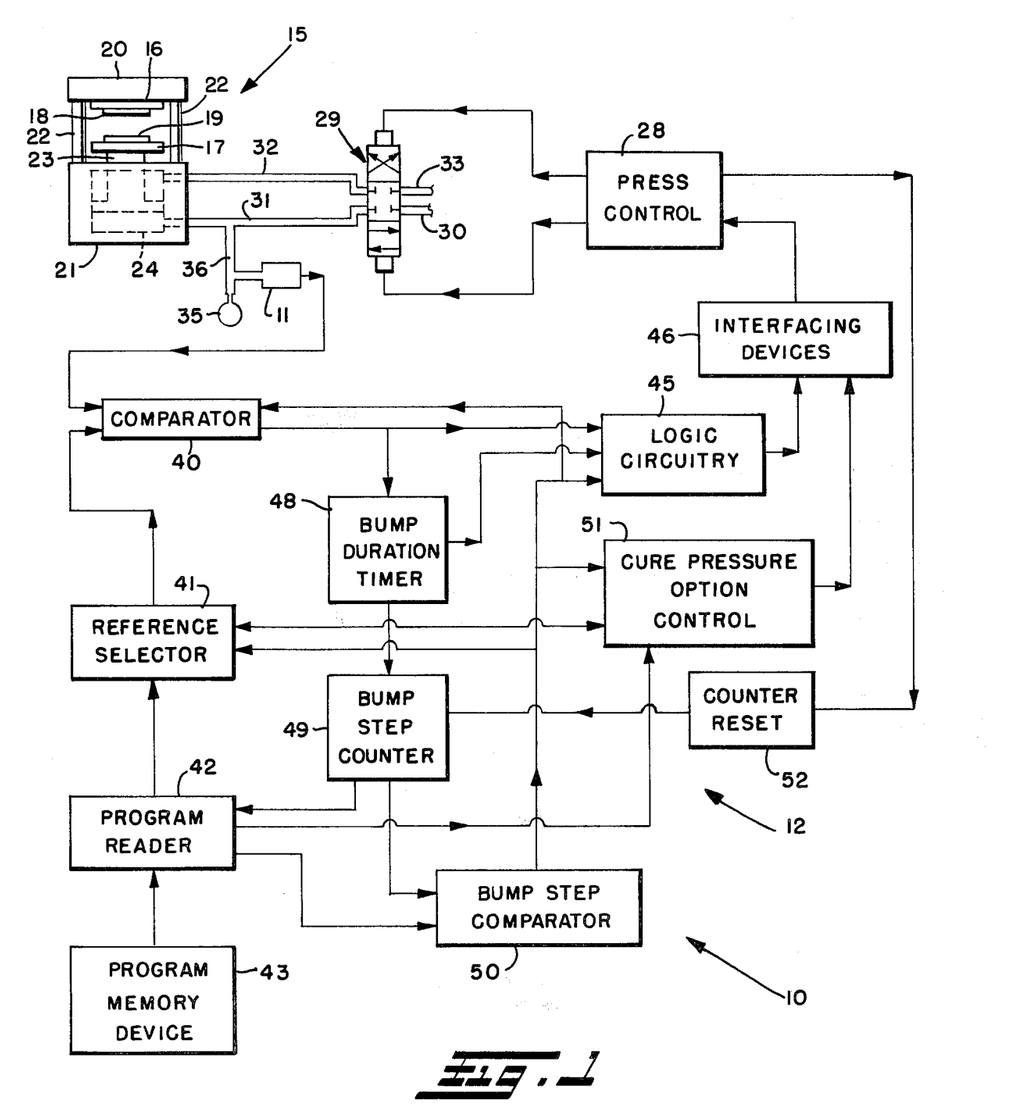
FIG. 1 is a diagramatic representation of a molding machine with control apparatus according to the present invention.

Referring now in detail to the drawings, a control apparatus according to the present invention is designated generally by reference numeral 10 in FIG. 1. The control apparatus 10 comprises a pressure monitor or transducer 11 and a control circuit 12, such control circuit being shown schematically in block form in FIG. 1 and more specifically in FIG. 2.

The control apparatus 10 may be used with a molding machine or press of any desired construction wherein one or more bumps, or breaths as they are also known, desirably are to be performed during closing of the press. A representative press with which the control apparatus 10 may be employed is designated generally by reference numeral 15 in FIG. 1 and includes top and bottom heating platens 16 and 17 to which upper and lower mold parts 18 and 19 may be attached, respectively. The top platen 16 is secured to a stationary bolster 20 which is supported above the press base 21 by posts 22. The bottom platen 17 is carried on a piston rod 23 of hydraulic ram 24 mounted in the press base 21.

Operation of the press 15 generally is controlled by a press control represented by block 28. The press control 28 typically includes a cycle timer which initiates and controls the duration of the various repetitive operational steps performed during each molding cycle such as the heating of the platens 16 and 17 and opening and closing of the press, or more particularly the mold parts 18 and 19.

In the illustrated press 15, the press control 28 actuates an electrohydraulic valve 29 for effecting opening and closing of the mold parts 18 and 19. The valve 29 selectively connects hydraulic fluid supply line 30 to the ram extend line 31 or ram retract line 32 to close or open the press, respectively, and the hydraulic fluid return line 33 to the other. When not actuated by the press control, the valve may remain in a neutral position blocking hydraulic flow to and from the ram 24. In presses employing gravity return type rams, the ram retract line 32 may always be connected to the return line 33 whereby the ram may retract, and the press open, by gravity.

A pressure gauge 35 desirably is provided in a tap 36 on the ram extend line 31 to provide a visual indication of the fluid line pressure in the ram extend line. It should be appreciated that with such arrangement, the line pressure in the ram extend line 31 when the press is closed will be directly proportional to the press clamp pressure acting on the mold parts 18 and 19. Typically, the pressure gauge 35 is calibrated to designate the press clamp pressure rather than the line pressure in the ram extend line.

The tap 36 provides a convenient location for connection of the pressure transducer 11 which preferably is of the semiconductor strain gauge type capable of measuring pressures from zero to 5,000 psi and producing a 0 to 5 DC voltage output signal which is directly proportional to the measured pressure. Accordingly, the voltage output signal of the transducer is directly proportional to the line pressure in the ram extend line 31 which in turn is directly proportional to the press clamp pressure. As a result, the voltage output signal of the transducer is indicative of the press clamp pressure and is modulated in accordance with the change in press clamp pressure. In other words, the pressure transducer provides a modulated analog output signal which varies linearly with the press clamp pressure.

The fundamental components of the control circuit 12, which are schematically illustrated in block form in FIG. 1, now will be described in conjunction with their operation and the operation of the press 15, such press operation being initiated as follows. With the press ram 24 retracted and a charge of uncured rubber or other material in the mold parts 18 and 19, the press control 28 energizes the electrohydraulic valve 29 so as to extend the ram to effect closure of the press and the mold parts 18 and 19 therein, such as by connecting the pressure supply line 30 to the ram extend line 31. As pressure is supplied to the ram through the ram extend line, the press will close the mold parts, and when closed, apply clamp pressure to the mold parts. As clamp pressure increases, such pressure will be measured by the pressure transducer 11 which supplies an output signal indicative of the measured pressure to a comparator 40 of the control circuit 12.

The comparator 40 compares the output signal of the pressure transducer 11 with a reference signal then selected and supplid by a reference selector 41. The purpose of the reference selector 41 is to select and to supply to the comparator reference input one of a number of predetermined and calibrated reference signals respectively indicative of bump pressures at which bumps may occur, such selection being dictated by a command signal received from a program reader 42. The program reader 42 sequentially supplies command signals to the reference selector in accordance with a bump cycle program carried by a program memory device 43, such program memory device having encoded therein bump sequencing information dictating the selection and sequential order of presentation of the reference signals by the reference selector to the comparator for each sequential bump to be performed by the press. The program thusly dictates at what pressures each bump will be performed and the sequence thereof as well as the total number of bumps.

The comparator 40 compares the output signal of the pressure transducer 11 to the then selected reference signal until a predetermined relationship comes to exist therebetween; at that point, the comparator produces a control or trigger signal which performs two functions. To effect one of these functions, the control signal is supplied to logic circuitry 45 which in response thereto under logic conditions indicating that a bump still remains to be performed, operates interfacing devices 46 connected to the press control 28 that in turn operate the valve 29 by moving it to its ram retract position so as to reduce the press clamp pressure and/or open the mold parts 18 and 19 to allow escape of any entrapped air and gas. The second function of the control signal is to start a bump duration timer 48 which controls the duration time of the bump, i.e., the period during which the press continues to open. Although the bump duration timer may start immediately upon receipt of the control signal whereupon the bump duration is timed immediately upon initiation of the bump, preferably the bump duration timer does not start until press pressure drops to a nominal pressure which is the same for all bumps so that the difference in press ram travel or opening is minimized between high and low pressure bumps.

To this end, the control signal from the comparator 40 directs the reference selector 41 to supply to the comparator 40 a nominal reference signal indicative of the nominal press pressure which necessarily is lower than that at which the bumps occur. The comparator then compares the output signal of the pressure transducer with such nominal reference signal and in response to a predetermined relationship therebetween, provides a second control signal that starts the bump duration timer 48. When the bump duration timer times out, it transmits a signal to the logic circuitry 45 which in response thereto, operates the interfacing devices 46 that in turn operates the valve 29 by returning it to its ram extend position so as again to extend the ram 24 and to apply clamp pressure to the mold parts 18 and 19 thereby to complete the bump.

The bump duration timer 48 upon timing out also advances the count of a bump step counter 49. The bump step counter 49 counts the number of bumps that have been performed and transmits a logic signal representative thereof to the program reader 42. This logic signal instructs the program reader as to which command signal then is to be supplied to the reference selector 41 in accordance with the bump cycle program carried by the program memory device 43. With this new command signal supplied to the reference selector 31, the reference selector selects the next reference signal to be supplied to the comparator 40 and transmits same thereto for comparison with the output signal of the transducer 11. The comparator 40 compares the output signal at the transducer 11 with the new reference signal and in response to a predetermined relationship therebetween, provides another control signal to the logic circuitry 45 for initiating performance of the next press bump. The control signal from the comparator also again instructs the reference selector to supply the nominal reference signal to the comparator for comparison with the output signal of the pressure transducer 11 as the press opens. In response to the predetermined relationship between the output signal of the pressure transducer and the nominal reference signal, the comparator again provides a second control signal which starts the bump duration timer 48. Upon timing out of the bump duration timer 48, an output signal is supplied to the logic circuitry 45 which in turn operates the valve 29 so as again to extend the ram and again to apply clamp pressure to the mold parts 18 and 19.

The foregoing bumping operation continues bump by bump until the total number of bumps dictated by the program memory device 43 has been performed. This is determined by a bump step comparator 50 which compares the logic signal output of the bump counter 49 representative of the number of bumps that have been performed with a logic signal from the program reader 42 representative of the total number of bumps to be performed as dictated by the program memory device. When the bump step comparator 50 determines that the dictated number of bumps have been performed, it transmits an inhibit signal to the logic circuitry 45 whereupon the logic circuitry no longer will effect operation of the valve 29 in response to control signals received from the comparator 40. Accordingly, no further bumps will be performed and cure pressure may be applied as follows until the cycle timer of the press control 28 times out and the press opens thus completing the molding cycle.

During cure, the pressure may be determined by a cure pressure option control 51 which, upon receipt of the output signal from the bump step comparator 50 indicating that the last prescribed bump has been performed, functions to provide for either full pressure or low pressure cure. For full pressure cure, the cure pressure option control allows the press after the last bump has been performed to attain and maintain full press clamp pressure during cure. For low pressure cure, the cure pressure option control causes the press to attain and be maintained at a pressure determined by comparison of the output signal of the pressure transducer 11 with a selected reference signal indicative of the desired cure pressure, such selection being made by the reference selector 41 in accordance with the program carried by the program memory device 43. The program memory device may also dictate whether full or low pressure cure is to be effected by the control, such information being read and conveyed by the program reader 42 to the cure pressure option control.

During low pressure cure, the comparator 40 compares the output signal of the pressure transducer 11 to the thusly selected reference signal indicative of the program prescribed cure pressure and upon a predetermined relationship therebetween indicating that the prescribed cure pressure has been attained, produces a control signal as in the manner previously indicated in connection with the performance of a bump. The control signal is supplied to the cure pressure option control 51 which in response thereto, operates the interfacing devices 46 connected to the press control 28 that in turn operates the valve 29 by moving it to its neutral position blocking hydraulic flow to and from the press ram.

Accordingly, the press will be held at the prescribed pressure. However, if there is hydraulic pressure leakage, the press clamp pressure will slowly decay. The comparator however will produce a second control signal when pressure has leaked off a predetermined amount. In response to this second control signal, the cure pressure option control 51 through the interfacing devices will cause the valve 29 to move to its ram extend position whereupon press clamp pressure will be increased until the prescribed cure pressure is restored as determined by a comparison of the transducer output signal and the selected reference signal by the comparator in the foregoing manner.

The control circuit 12 also includes a counter reset 52 which resets the bump step counter at the start or end of a molding cycle.

Figure 2:
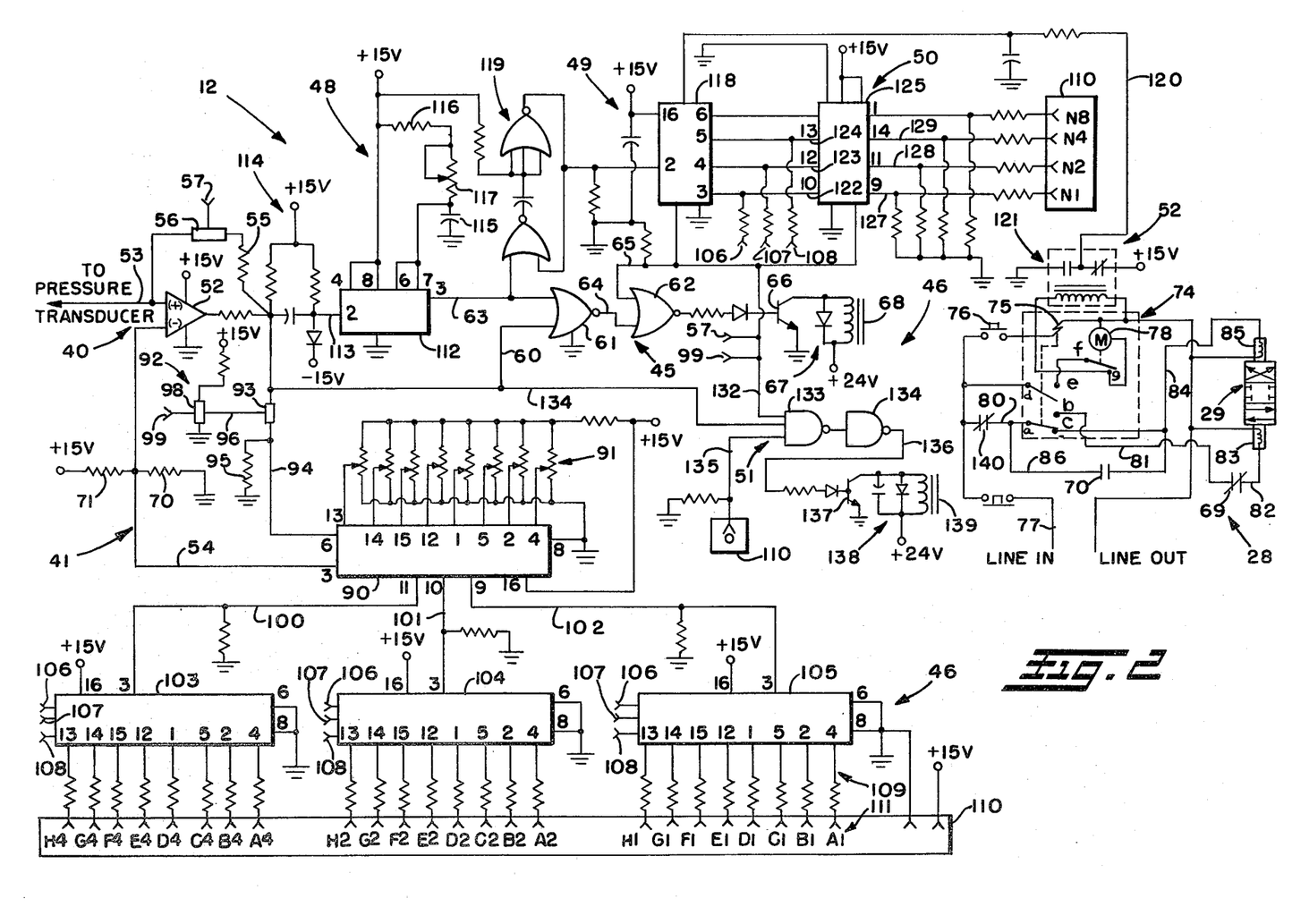
FIG. 2 is a specific schematic electric circuit diagram depicting a specific embodiment of the control circuit employed in the control apparatus.

Reference now being had to FIG. 2, a specific form of the control circuit 12 is schematically illustrated and will now be described. For purposes of this description, it should be understood that a logic 0 signal herein indicates a connection to a source of relative ground potential and a logic 1 signal indicates a connection to a relative positive potential. If desired, however, other logic conventions may be used as will be clear to those skilled in the art. In addition, various operating potentials required by the circuit are indicated in some instances as being applied at selected points in the circuitry and all such potentials may be provided from a conventional power supply not shown.

As shown in FIG. 2, the comparator 40 includes an analog comparator 52 which, for example, may be one of the four independent voltage comparators of a conventional quad comparator. The output signal from the pressure transducer 11 is fed via line 53 to the non-inverting input of the analog comparator 52 whereas the reference signal from the reference selector 41, described hereinafter in greater detail, is fed via line 54 to the inverting or reference input. As long as the voltage of the output signal from the transducer is lower than that of the reference signal, the output of the analog comparator will be at logic 0. However, as press clamp pressure increases during closing of the press 15, the voltage of the output signal at the non-inverting input will come to exceed that of the reference signal at the inverting input whereupon the output of the analog comparator will go to a positive saturation voltage.

The output of the analog comparator 42 may be coupled to its non-inverting input through a resistor 55 by means of a switch 56 which for example may be one of the four switches of a conventional quad bilateral switch. The control input of the switch 56 is connected by a line 57 to the output of the bump step comparator 50 which is described hereinafter in greater detail. When the control input is at logic 0, the switch is open whereas when the control input is at logic 1, the switch is closed whereby the output of the comparator 40 is connected to its non-inverting input through the resistor 55. The value of the resistor 55 is selected to provide a prescribed amount of hysteresis to the comparator 40 to prevent rapid oscillation thereof during the hereinafter described low pressure cure mode.

The output of the analog comparator 52 also is coupled by line 60 to the logic circuitry 45 which includes a pair of NOR gates 61 and 62. The NOR gate 61 has two inputs, one being coupled to line 60 and the other being coupled by line 63 to the output of the bump duration timer 48 which is described hereinafter in greater detail. The output of the NOR gate 61 is coupled by line 64 to one of the two inputs of the other NOR gate 62. The other input of NOR gate 62 is coupled by line 65 to the bump step comparator 50 which also is described hereinafter in greater detail.

The output of the NOR gate 62 is coupled by interfacing devices 46 to the press control 28. The interfacing devices 46, for example, may include a transistor switch 66 which is turned on when the NOR gate 62 is satisfied. When the transistor switch 66 is turned on, a relay energization circuit 67 is completed to effect energization of a bump relay 68 that opens the normally closed relay contacts 69 thereof and closes the normally open relay contacts 70 thereof. The relay contacts 69 and 70 may be connected as indicated in the electric circuitry of the press control 28 which controls the electrohydraulic valve 29.

In the illustrated arrangement, the press control 28 includes a cycle timer 74 which for example may be a conventional CYCL-FLEX timer manufactured by Eagle Signal, a division of Gulf & Western Industries, Inc., Davenport, Iowa. The timer 74 includes instantaneous contacts a-b and a-c which respectively close and open upon energization of the clutch coil 75 when a start switch 76 is closed. Also provided are instantaneous contacts d-e which close upon energization of the clutch coil 75 and connect a power supply line 77 to the timer motor 78 to begin timing of the period at which the timer may be set. Closing of the contacts d-e also maintains the clutch coil energized upon opening of the start switch until delay contacts f-g open upon timing out of the timer. When the normally closed contacts f-g open, the clutch coil is deenergized and the instantaneous contacts a-b, a-c and d-e are reset.

The terminal a of contacts a-b is connected to the power supply line 77 by line 80 and the terminal b is connected by line 81 to the normally closed relay contacts 69 which in turn are connected by line 82 to the ram extend solenoid 83 of the electrohydraulic valve 29 that upon energization moves the valve to its ram extend position. On the other hand, the terminal c is connected by line 84 to the other or ram retract solenoid 85 of the valve 29 that upon energization moves the valve to its ram retract position. The other or normally open relay contacts 70 are connected in line 86 that is connected across the relay contacts a-c to the line 80 and the line 84. Accordingly, when the timer 74 is started the timer contacts a-b close to operate the valve 29 so as to close the press. However, when the bump relay 68 is energized, the relay contacts 69 open and the relay contacts 70 close whereby the valve will be caused to move to its ram retract position to open the press. Upon deenergization of the relay 68, the valve will again return to its ram extend position so as to again effect closure of the press as long as the timer has not timed out.

For present purposes, it should be appreciated that, initially, both input signals to the NOR gate 61 will be at logic 0. Accordingly, the output signal of the NOR gate 61 will be at logic 1. Also during initial closing of the press, as long as at least one bump is to be performed, the input signal to the NOR gate 62 conveyed by line 65 will be at a logic 0. Accordingly, the output signal of the NOR gate 62 will be at logic 0 and the bump relay 68 will be deenergized. Accordingly, the valve 29 can move to its ram extend position upon starting of the cycle timer 74 to effect closure of the press and application of clamp pressure to the mold parts 18 and 19.

However, when the output of the analog comparator 52 goes to a positive saturation voltage in the above indicated manner, the NOR gate 61 will receive a logic 1 signal at its input connected to the line 60. Consequently, the output signal of NOR gate 61 will be at a logic 0 thereby satisfying the NOR gate 62. Accordingly, the NOR gate 62 will supply a logic 1 output signal, i.e., a positive voltage output, which turns on the transistor switch 66 to effect energization of the bump relay 68. Upon energization of the bump relay 68, the valve 29 is moved to its ram retract position to initiate a bump.

Referring now in greater detail to the reference selector 41, such selector may include a decoder 90 which for example may be an analog demultiplexer. The illustrated decoder 90 selects any one of eight reference signal voltages according to a digital input address consisting of three bits of binary coded decimal (BCD) information. The decoder includes eight switches which have their inputs connected to a supply voltage through respective variable potentiometers indicated collectively by reference numeral 91. The potentiometers 91 may be set to provide eight different reference signals indicative of eight different pressures at which a bump may be initiated. The decoder also has an output which is connected to the line 54 leading to the inverting input of the analog comparator 52. The line 54 also is connected to ground through resistor 70 and to the voltage source through a resistor 71.

The decoder 90 also has an inhibit input which is connected through an inhibit signal control circuit 92 to the output of the analog comparator 52. The inhibit signal control circuit 92 includes a switch 93 which is connected in a line 94 that leads from the comparator output to the inhibit input of the decoder and also to ground through resistor 95. The control input of the switch 93 is connected by line 96 to a voltage source through resistor 97 and to ground through a switch 98 when the latter is closed. The control input of the switch 98 is connected to the output of the bump step comparator 50 by line 99.

As discussed below, the output of the bump step comparator 50 goes to logic 1 when the total number of bumps prescribed by the program memory device has been performed. When this occurs, the switch 98 will close and this causes the switch 93 to open so that the decoder 90 may not become inhibited when the analog comparator 52 goes to its high state. However, when the total number of bumps has not yet been performed, the bump step comparator output will be at logic 0 and the switch 98 will be open. Accordingly, the switch 93 will be closed so that the decoder 90 will become inhibited when the analog comparator 52 goes to its high state. When an inhibit signal thusly is applied to the inhibit input of the decoder, a nominal reference signal will be impressed upon line 54 and its value will be determined by the relative values of the resistor 71 and 70. Such nominal reference signal is relatively small and may, for example, be indicative of a press pressure of approximately 10% of full press pressure.

The decoder 90 has its address input connected by lines 100–102 to the program reader 46 which supplies coded command signals identifying which reference voltage is to be selected and supplied to the analog comparator 52 for each bump step. The program reader shown is one which is capable of receiving and deciphering the command signals encoded in the program memory device 43. The program memory device 43 may be a conventional printed circuit card having permanently encoded therein the BCD coded command signals for a particular job. Although a non-volatile program memory is preferred for reasons that are discussed hereinafter, other types of program memory devices and suitable readers therefor may be used. For example, a random access memory may be employed for storing a number of different programs required for different jobs.

The illustrated program reader 46 includes three decoders 103–105, each of which, for example, may be a demultiplexer. The decoders 103–105 have their outputs respectively connected by the lines 100–102 to the address inputs of the decoder 90. Accordingly, the decoders 103–105 respectively supply the 4-2-1 information bits of a BCD command signal to the decoder 90.

Like the decoder 90, the decoders 103–105 each have eight switch inputs which are selectively connected to the output thereof according to a BCD coded signal received at its address input. The address inputs of the decoders 103–105 are commonly connected as by lines 106–108 to the step counter 49 which as described hereinafter provides a binary number output signal indicative of the number of bumps that have been performed during the press closing operation. Accordingly, when no bumps have yet been initiated, the bump step counter will have a binary zero output and the decoders 103–105 will couple their binary zero switch inputs to their outputs. After the first bump has been initiated, the bump step counter will have a binary one output and the decoders 103–105 will couple their binary one switch inputs to their outputs. In like manner, the other switch inputs will be coupled to the outputs depending upon which bump is next to be performed.

From this, it can readily be understood that the binary zero switch inputs of the decoders 103–105 must receive from the program memory device 43 the BCD command signal corresponding to reference signal indicative of the desired bump pressure for the first bump whereas the binary one switch inputs of the decoders must receive the BCD command signal corresponding to the second bump, and so on. To effect this, the switch inputs of the decoders 103–105 may be connected by the lines collectively designated by reference numeral 109 to the corresponding outputs of the program memory device 43. Where the program memory is in the form of a printed circuit card, a suitable socket, indicated by block 110, may be provided in which the printed circuit card 43 may be plugged to effect such connection. In FIG. 2, the socket contacts are schematically illustrated at 111.

Referring now to the bump duration timer 48, such may include a conventional 555 timer 112 which has its trigger input connected by line 113 to a pulse forming circuit 114. In the illustrated arrangement, the timer 112 is set up to start upon receiving a negative pulse from the pulse forming circuit 114 connected to the output of the analog comparator 52. The pulse forming circuit will generate a negative pulse when the analog comparator goes from its high state to its low state. In response to such negative pulse, the timer will generate a positive output or logic 1 signal at its output for a duration determined by the values of capacitor 115, the resistor 116, and the potentiometer 117 which is utilized as a variable resistor. The potentiometer 117 may be adjusted to obtain the desired bump duration time.

As previously indicated, the output of the timer 112 is connected by line 63 to an input of the NOR gate 61 of logic circuitry 45. The output of the timer also is connected by line 63 to the bump step counter 49.

The bump step counter 49 includes a digital counter 118 which may be, for example, one of the decade counters of a conventional dual BCD counter. The digital counter 118 has its high-to-low triggered clock input connected to line 63 through a signal stretching circuit 119 that prevents false triggering of the counter due to voltage transients. Accordingly, the digital counter will advance one count each time the output of the timer goes from high to low, i.e., from logic 1 to logic 0. As this occurs only once for each bump, the digital counter will assume a count level indicative of the number of bumps that have occurred and produce a representative BCD signal at its output. For resetting the digital counter to zero at the start or end of each molding cycle, the reset input of the digital counter may be connected by line 120 to reset circuit 121 of the counter reset 52. The reset circuit normally places a high on the reset input which sets the counter at zero. However, upon starting of the press control timer 74, the reset circuit places a low on the reset input thus permitting the counter to advance.

As previously indicated, the output of the digital counter 118 is connected to the address inputs of the decoders 103–105 by the lines 106–108. Accordingly, the digital counter drives the decoders 103–105 that determine which command signal encoded in the program memory device 43 to send to the reference selector decoder 90. In addition, the ouput of the digital counter is connected by lines 122–124 to the bump step comparator 50.

The bump step comparator 50 includes a conventional digital comparator 125 which here is set up to compare four bit binary words to determine whether the words are equal or which is greater. The A word inputs of the digital comparator are connected to the output of the counter 118 by the lines 122–124 whereas the B word inputs receive information encoded in the program memory via the lines 127–129 connected to respective contacts of the aforementioned socket 110 in which a program carrying printed circuit card may be inserted. The printed circuit card may have encoded therein the total number of bumps to be performed during closing of the press in BCD format, such being supplied to the comparator 50 for comparison with the BCD output of the digital counter 118.

The output of the digital comparator 125, as previously indicated, is connected by line 65 to an input of the NOR gate 62 of the logic circuitry 45. More particularly, it is the A word greater than B word output that is connected to the input of the NOR gate 62. Accordingly, such output will remain at a logic 0 as long as the A words is less than the B word, i.e., as long as the number of bumps that have been performed does not exceed the total number of bumps indicated by the program memory. However, when the A word exceeds the B word, the output of the comparator will change to a logic 1 which unsatisfies the NOR gate 62 regardless of the other input to such NOR gate. Accordingly, the NOR gate 62 will have a logic 0 output which opens the transistor switch 66 and deenergizes the relay 68 whereby the press may be finally closed and cure pressure applied to the mold parts during cure.

As previously indicated, the output of the digital comparator 125 also is connected by line 99 to the control input of the latch 98 of the inhibit signal control circuit 92 and by line 57 to the control input of the switch 56 of the comparator 40. The digital comparator 125, in addition, has its output connected by line 132 to the cure pressure option control 51.

The cure pressure option control 51 includes a pair of NAND gates 133 and 134. As shown, the NAND gate 133 has three inputs, one being coupled to the output of the digital comparator 125 by line 132, one being coupled to the output of the analog comparator 52 by line 134, and one being coupled by line 135 to the socket 110 for receiving a cure pressure option signal encoded in the program memory device 43. The output of the NAND gate 133 is coupled across the inputs of the NAND gate 134 which accordingly functions as an inverter.

The NAND gate 134 has its output connected by line 136 to the gate of a transistor switch 137. When the transistor switch 137 is turned on by a logic 1 signal at its gate, a relay energization circuit 138 is completed to effect energization of a stop relay 139 which opens normally closed relay contacts 140. The normally closed relay contacts 140 are connected between the power supply line 77 of the press control and the terminal a of contacts a-b, a-c so that upon opening of the relay contacts 140, the electrohydraulic valve 29 will be deenergized and assume its neutral position blocking hydraulic flow to and from the press ram. Accordingly, when the relay contacts 140 are open, the press will hold the then existing clamp pressure.

For full pressure cure, the program memory device 43 will be encoded to supply a logic 0 to the NAND gate 133 via line 135. This essentially inhibits the cure option control 51, that is, the NAND gate 133 can never be satisfied. Accordingly, the NAND gate 133 will have a logic 1 output, the NAND gate 134 will have a logic 0 output, and the transistor switch 137 will be open whereby the relay contacts 140 will remain closed.

For low pressure cure, the program memory device 43 will be encoded to supply a logic 1 signal to the NAND gate 133 via the socket 110 thus satisfying one of the three conditions. The second condition is satisfied when the digital comparator 125 determins that the total number of prescribed bumps have been performed. For the third condition to be satisfied, the analog comparator 52 must go to its high state. This will occur when the output voltage of the transducer 11 equals or comes to exceed the voltage of the reference signal then supplied by the decoder 90 in accordance with the program which dictates the desired cure pressure. At this point, the NAND gate 133 is satisfied and supplies a logic 0 output signal. This drives the output of the NAND gate 134 to logic 1 which closes the transistor switch 137 thereby energizing the stop relay 139. Upon energization of the stop relay, the relay contacts 140 will open whereupon the valve 29 will be caused to move to its neutral position blocking hydraulic flow to and from the press ram.

It will be appreciated that if there is no hydraulic pressure leakage, the press will be held at the desired clamp pressure during cure. However, if the hydraulic pressure leaks off, the output voltage of the pressure transducer 11 will drop accordingly. The output voltage of the pressure transducer will continue to be compared by the analog comparator 52 with the voltage of then selected reference signal which is maintained at the reference input of the comparator because an inhibit signal is precluded from passing to the reference selector decoder 90 by means of the inhibit signal control circuit 92. In addition, the output of the comparator 40 will be coupled to its non-inverting input through the resistor 55 by the switch 56 which closes upon receiving the logic 1 output from the digital comparator 125. When the transducer output signal drop is equal to that applied through the resistor 55, the analog comparator 52 will go to its low state whereupon the NAND gate 133 will become unsatisfied. This in turn will result in deenergization of the stop relay 139 whereupon the relay contacts 140 will close. Upon closing of the relay contacts 140, the electrohydraulic valve 29 again will be moved to its ram extend position so as to restore the hydraulic clamp pressure until the analog comparator 52 again goes to its high state.

Still referring to FIG. 2, the operation of the therein illustrated control circuit will now be summarized. Initially, the digital counter 118 will have a binary zero output and the program reader decoders 103-105 will read or select the BCD command signal corresponding to the first bump from the program memory device 43 and supply it to the reference selector decoder 90. The reference selector decoder will select the reference signal according to such command signal and supply it to the analog comparator 52 for comparison with the output signal of the transducer 11. As the output voltage of the transducer initially will be less than the thusly selected and supplied reference signal voltage, the comparator will be in its low state and the inputs to the NOR gate 61 will be at logic 0, it being understood that the output of the timer also initially is at logic 0. Accordingly, the output of the NOR gate 61 will be at a logic 1. Also, before initial closure of the press is initiated, the input signal to the NOR gate 62 received from the digital comparator 125 will be at logic 0 as long as at least one bump is to be performed. Accordingly, the output signal of the NOR gate 62 will be at logic 0 and the bump relay 68 will be deenergized. In addition, the stop relay 139 will be deenergized as the NAND gate 133 will remain unsatisfied as long as the output of the digital comparator remains at logic 0 indicating that a bump yet remains to be performed.

To begin the molding cycle, the cycle timer 74 of the press control 28 is set to the desired cycle time and the start switch 76 is closed. Upon closing of the start switch, the contacts a-b close to supply power to the ram extend solenoid 83 of the electrohydraulic valve 29 so as to effect closure of the press and application of clamp pressure to the mold parts 18 and 19. As the press closes, the output of the transducer 11 will be continuously compared with the then selected reference signal and the analog comparator 52 will remain in its low state as long as the output signal of the transducer is at a lower voltage than that of the then selected reference signal. However, when the voltage of the output signal of the transducer matches or comes to exceed that of the then selected reference signal, the analog comparator will go to its high state. Upon doing so, a high or logic 1 signal is supplied to the input of the NOR gate 61. Consequently, the output of the NOR gate 61 will switch to a logic 0 thereby satisfying the NOR gate 62. Accordingly, the NOR gate 62 will supply a logic 1 output signal, i.e., a positive voltage output, which turns on the transistor switch 66 to effect energization of the bump relay 68. Upon energization of the bump relay 68, the relay contacts 69 open and the relay contacts 70 close whereby power is supplied to the ram retract coil 85 of the valve 29 so as to effect opening of the press and initiate a bump.

In addition to initiating the bump, the high or logic 1 output signal from the analog comparator 52 is applied to the inhibit input of the reference selector decoder 90 as long as the switch 93 of the inhibit signal control circuit 92 remains closed, such switch remaining closed until the total number of bumps dictated by the program memory device have been performed. Consequently, the output of the reference selector decoder 90 is inhibited. When this occurs, a nominal reference voltage is applied to the reference input of the analog comparator 52, such nominal reference voltage being determined by the relative values of the resistors 71 and 72 and being indicative of a relatively small press clamp pressure which may for example by approximately 10% of full press clamp pressure. As the nominal reference voltage is indicative of a press pressure lower than that indicated by any of the reference signals, the analog comparator 52 initially will remain in its high state. However, when the transducer output signal voltage drops below that of the nominal reference signal, the analog comparator will return to its low state. When this occurs, a negative pulse will be generated in pulse generating circuitry 114, which negative pulse starts the timer 112.

The timer 112, in response to such negative pulse, will generate a high or logic 1 signal at its output for a duration determined by the values of capacitor 115, resistor 116, and the potentiometer 117. As long as the timer has a logic 1 output, the NOR gate 61 will remain unsatisfied notwithstanding the other input of such NOR gate having gone to a logic 0 upon switching of the analog comparator 52 from its high to low state. Accordingly, the logic circuitry 45 will continue to direct the press control 28 to open the press. However, upon timing out of the timer 112, the output signal of the timer will go to a logic 0 and the NOR gate 61 will be satisfied. Accordingly, the output signal of the NOR gate 61 will switch to a logic 1 whereupon the NOR gate 62 no longer will be satisfied. This switches the output signal of the NOR gate 62 from a logic 1 to a logic 0 which opens the transistor switch 66 thereby to effect deenergization of the bump relay 68. Upon deenergization of the bump relay, the relay contacts 70 will open and the relay contacts 69 will close whereupon power is again supplied to the ram extend coil 83 of the valve 29 to again effect closure of the press and application of clamp pressure to the mold parts.

Also upon switching of the timer 112 from a logic 1 to a logic 0 output, the digital counter 118 will advance by one count and thusly assume a count level indicative of the number of bumps that have occurred. Accordingly, the digital counter will now have a binary one output and the program reader decoders 103-105 will read or select the corresponding BCD command signal from the program memory 43 and supply it to the reference selector decoder 90. The reference selector decoder will select the reference signal according to such command signal and supply it to the analog comparator 52 for comparison with the output signal of the transducer 11. The analog comparator 52 then compares the output signal of the transducer 11 with the new reference signal and upon a match of the respective voltages thereof, switches from its low to high state to initiate performance of the next press bump in the above indicated manner.

The foregoing bumping operation continues bump by bump until the total number of bumps dictated by the program input device 43 has been performed as determined by the digital comparator 125. The digital comparator compares the logic signal output of the digital counter 118 representative of the number of bumps that have been performed with a logic signal representative of the total number of bumps to be performed as dictated by the program memory device 43. When the digital comparator 125 determines that the dictated number of bumps have been performed, it transmits a logic 1 signal to the input of the NOR gate 62 whereupon such NOR gate will become and remain unsatisfied. Accordingly, the bump relay 68 will remain deenergized until a new molding cycle is initiated. The digital comparator will also supply a logic 1 signal to the NAND gate 133.

If the NAND gate 133 receives a logic 0 signal from the program memory device 43 via socket 110 indicating that full pressure cure is prescribed, such NAND gate will never become satisfied whereby the stop relay 139 will remain deenergized. Accordingly, the valve 29 will remain in its ram extend position during the remainder of the molding cycle, and the press will attain and maintain full clamp pressure during the remainder of the molding cycle. Upon timing out of the cycle timer 74, the contacts a-c will close whereupon power is supplied to the ram retract coil 85 of the valve 29 so as to effect opening of the press at the completion of the molding cycle.

If low pressure cure is prescribed by the program memory device 43, a high or logic 1 signal is applied to the NAND gate 133 along with the logic 1 signal then received from the digital comparator 125. Accordingly, two of the three conditions of the NAND gate 133 will be satisfied. The third condition will be satisfied when the output voltage of the pressure transducer exceeds the voltage of the reference signal then supplied to the analog comparator 52 by the reference selector decoder 90.

The reference signal supplied to the analog comparator 52 at this point will be that indicated by a command signal corresponding to a BCD output of the digital counter 118 representative of the total number of bumps plus one. That is, the program memory device 43 dictates one additional command signal identifying a reference signal indicative of cure pressure.

As pressure is applied to the press after the last bump has been performed, the analog comparator 52 will continuously compare the output signal of the pressure transducer 11 to the thusly selected reference signal. As long as the output voltage of the transducer is less than that of the reference signal, the analog comparator 52 will remain in its low state and the NAND gate 133 will remain unsatisfied. However, when the output voltage of the transducer goes to a positive saturation voltage, the NAND gate 133 will become satisfied and switch to a logic 0 output. Accordingly, the NAND gate 134 will have a logic 1 output signal which turns on the transistor switch 137 to effect energization of the stop relay 139. Upon energization of the stop relay 139, power to the electrohydraulic valve 29 is cut off whereupon such valve moves to its neutral position blocking hydraulic flow to and from the press ram. Accordingly, the press will be held at the pressure dictated by the then supplied reference signal.

However, if there is hydraulic pressure leakage, the press clamp pressure will slowly decay. The output of the transducer 11 will correspondingly drop such that the analog comparator 52 will switch to its low state. Upon switching of the analog comparator to its low state, the NAND gate 133 becomes unsatisfied whereupon power is again supplied to the ram extend coil 83 of the valve 29 so as to again increase press pressure. Press pressure will continue to increase until the analog comparator switches to its high state in the foregoing manner; at this point, the valve 29 will again be deenergized and block hydraulic flow to and from the press ram. During this sustaining of press clamp pressure during cure, it should be appreciated that the output of the analog comparator 52 is coupled to its non-inverting input through the resistor 55 by means of the switch 56 which is closed upon receiving a logic 1 output signal from the digital comparator 125 indicating that all of the bumps have been performed. As a result, a prescribed amount of hysteresis is provided to prevent rapid oscillation of the analog comparator 52.

It can now be seen that the control apparatus described herein advantageously provides for automatic programmed sequencing of pressure bumps at precisely determined pressures in a molding press. For example, the press may be bumped first at a low pressure and then at progressively greater pressures during closing of the press, it being appreciated that the reference signals may be set to indicate such progressively greater pressures. Furthermore, the press may open the same amount during each bump regardless of the pressure at which the bump is initiated. Because the bumping operation is automatic, no longer must the press operator be saddled to the press during the bumping operation. The press operator therefore is free to perform other tasks thereby resulting in increased productivity. Moreover, the control apparatus assures repetition of the desired bumping procedure for each molding cycle and job and effects performance of the bumps at precisely determined pressures rather than at approximations thereof, such leading to low scrap rates. In addition, the apparatus advantageously optionally provides for full pressure cure or low pressure cure at a selected and precisely determined pressure. As a result, the press may be bumped at progressively greater pressures up to a high pressure and then set back to a low pressure for cure so as to eliminate back rinding.

Although the invention has been shown and described with respect to a preferred embodiment, it is obvious that equivalent alterations and modifications will occur to others skilled in the art upon the reading and understanding of the specification. Moreover, the control apparatus according to the invention, although primarily intended for use with molding machines, may have other applications as well. For example, the control apparatus may be used with other devices where desired functions are to be performed automatically at predetermined values of a measured parameter. The present invention includes all such equivalent alterations and modifications and encompasses such other applications, and is limited only by the scope of the following claims.

What is claimed is:

1. A method of controlling the bumping operation of a press comprising the steps of:
    (a) supplying an output signal proportional to press pressure,
    (b) selectively and sequentially supplying reference signals respectively indicative of different pressures at which bumps may be performed in accordance with a predetermined program,
    (c) comparing the output signal with each selectively supplied reference signal, (d) supplying a control signal upon a predetermined relationship between the output signal and then selected reference signal, and (e) directing the press to perform a bump in response to such control signal.

2. A method of controlling the bumping operation of a press, comprising the steps of:

(a) sensing press pressure and providing an output signal indicative of sensed press pressure, (b) sequentially producing a number of preselected reference signals respectively indicative of bump pressures, (c) sequentially comparing the output signal with the reference signals, and (d) producing a control output signal in response to a predetermined relationship between each reference signal and the output signal, and wherein step (b) includes providing program command signals respectively indicative of the reference signal to be compared at each sequential bump and selecting and supplying the reference signals for sequential comparison with the output signal in accordance with the command signals, and comprising the further steps of providing a further program command signal indicative of one of the reference signals corresponding to a desired cure pressure, supplying such command signal to a reference signal selector after the last bump has been performed for selecting such one of the reference signals for comparison with the output signal, and then directing the press to hold press pressure in response to a predetermined relationship between the output signal and such one of the reference signals.

3. A method of controlling the bumping operation of a press, comprising the steps of:

(a) sensing press pressure and providing an output signal indicative of sensed press pressure, (b) sequentially producing a number of preselected reference signals respectively indicative of bump pressures, (c) sequentially comparing the output signal with the reference signals, and (d) producing a control output signal in response to a predetermined relationship between each reference signal and the output signal, and wherein step (b) includes producing a number of reference signals respectively indicative of different bump pressures and selectively determining which reference signal is to be compared with the output signal for each sequential bump.

4. The method of claim 3 comprising the further step of controlling the duration of each bump with a bump duration timer.

5. The method of claim 4 comprising the further step of starting the bump duration timer upon the press pressure dropping to a nominal pressure common to each bump.

6. A method of controlling the bumping operation of a press, comprising the steps of:

(a) sensing press pressure and providing an output signal indicative of sensed press pressure, (b) sequentially producing a number of preselected reference signals respectively indicative of bump pressures, (c) sequentially comparing the output signal with the reference signals, (d) producing a control output signal in response to a predetermined relationship between each reference signal and the output signal, and (e) directing the press to perform a bump in response to the control output signal.

7. The method of claim 6 wherein step (a) includes producing an analog output signal proportional to sensed pressure.

8. The method of claim 6 wherein step (a) includes using a pressure transducer to produce an analog output signal proportional to sensed pressure.

9. The method of claim 8 wherein step (b) includes sequentially producing preselected analog reference signals, and step (c) includes comparing the analog output signal and reference signals with an analog comparator.

10. The method of claim 6 wherein step (b) includes providing program command signals respectively indicative of the reference signal to be compared at each sequential bump and selecting and supplying the reference signals for sequential comparison with the output signal in accordance with the command signals.

11. The method of claim 10 comprising the further step of reading a program memory device and providing the command signals in accordance with program information carried by the program memory device.

12. The method of claim 11 comprising the further step of utilizing a program memory device of nonvolatile type having the program information fixedly encoded therein.

13. An apparatus for controlling the bumping operation of a molding press, comprising means for supplying an output signal indicative of press pressure, and control means for comparing the output signal with program selected reference signals respectively indicative of different bump pressures and, in response to a predetermined relationship between the output signal and then selected reference signal, directing the press to perform a bump, and cure pressure control means for controlling the pressure of the press during cure, said control means including means for producing a number of reference signals respectively indicative of different bump pressures, means for selectively determining which reference signal is to be supplied for each sequential bump, means for comparing the output signal with the then supplied reference signal and supplying a control signal in response to a predetermined relationship therebetween, such being indicative of the attainment of the bump pressure indicated by the then selected reference signal, and means responsive to said control signal for directing the press to perform a bump, said means for selectively determining including programmable means for providing command signals respectively indicative of the reference signals to be supplied to said means for comparing for sequential bumps and means for selecting and supplying a reference signal to said means for comparing in accordance with a command signal provided by said programmable means, said programmable means producing a command signal indicative of one of the reference signals corresponding to a desired cure pressure, said means for selectively determining further including means for supplying said command signal to said means for selecting and supplying after the last prescribed bump has been performed whereupon such one of the reference signals is supplied to said means for comparing, said cure pressure control means including means responsive to the control signal produced by said means for comparing upon a predetermined relationship between the output signal and such one of said reference signals for directing the press to hold press pressure, said means for selectively determining further including bump step counter means for counting the number of bumps that have been performed and providing a signal representative of such number to said programmable means so that when said counter means moves to the next sequential step, said programmable means will provide to said means for selecting and supplying the command signal dictating the reference signal for the next sequential step, said programmable means producing a signal representative of the total number of bumps to be performed during a molding cycle, and said control means further including bump step comparator means for comparing the signal representative of such number of bumps that have been performed with said signal representative of the total number of bumps to be performed and, upon a match therebetween, directing the means for selectively determining to supply the command signal indicative of such one of the reference signals corresponding to a desired cure pressure to said means for selecting and supplying.

14. In a press having cooperating mold sections defining a mold cavity therebetween and control apparatus for controlling the bumping of mold clamping pressure, the improvement comprising said control apparatus including:

a pressure transducer for providing an analog output signal directly proportional to mold pressure sensed by said transducer, means for automatically sequentially producing plural preselected analog reference signals, analog comparator means for sequentially comparing the analog output signal of said transducer with said plural analog reference signals, and means for generating a control output signal in response to a predetermined relationship between each of said reference signals and the output signal of said transducer.

15. The apparatus of claim 14 wherein said control means further includes means responsive to the control output signal from said means for generating for directing the press to perform a bump.

16. In a press having cooperating mold sections defining a mold cavity therebetween and control apparatus to control the bump operation of the press, the improvement comprising said control apparatus including:

transducer means for measuring press pressure and providing an output signal indicative of the measured pressure, means for sequentially supplying reference signals respectively indicative of bump pressures, means for sequentially comparing the output signal with the reference signals and supplying a control signal upon a predetermined relationship between each of the reference signals and the output signal which is indicative of the press attaining the pressure indicated by the then supplied reference signal, and means for receiving the control signal from said means for sequentially comparing and for directing the press to perform a bump in response thereto, said means for receiving and directing including timer means for controlling the duration time of the bump, and means for starting the bump duration timer upon the press pressure dropping to a nominal pressure common to each bump.

17. The apparatus of claim 16 wherein said means for starting the bump duration timer includes means for supplying a nominal reference signal indicative of such nominal pressure to said means for comparing in response to said control signal, said means for comparing then comparing the output signal of the transducer means with said nominal reference signal and upon a predetermined relationship therebetween supplying a start signal to said timer means.

18. The apparatus of claim 17 wherein said means for supplying includes means for selecting a selected one of a number of different reference signals respectively indicative of different press pressures and means for supplying said means for selecting a command signal dictating such selection.

19. The apparatus of claim 18 wherein said means for supplying a nominal reference signal supplies the same nominal reference signal for each bump.

20. In a press having cooperating mold sections defining a mold cavity therebetween and control apparatus for controlling the bumping of mold clamping pressure, the improvement comprising said control apparatus including:

a pressure transducer for providing an analog output signal directly proportional to mold pressure sensed by said transducer, means for automatically sequentially producing plural preselected analog reference signals, analog comparator means for sequentially comparing the analog output signal of said transducer with said plural analog reference signals, means for generating a control output signal in response to a predetermined relationship between each of said reference signals and the output signal of said transducer, and means responsive to the control output signal from said means for generating for directing the press to perform a bump, said means for automatically sequentially producing including means for producing a number of analog reference signals respectively indicative of different bump pressures and means for selectively determining which analog reference signal is to be supplied to said analog comparator means for each sequential bump.

21. The apparatus of claim 20 wherein said analog comparator means has a reference signal input, said means for selectively determining includes a decoder having an output connected to said reference signal input and a number of inputs selectively connectable to said output, and said means for producing includes reference signal generators connected respectively to the inputs of said decoder.

22. The apparatus of claim 21 wherein said reference signal generators each include variable attenuating means connecting a common signal source to the respective input of the decoder.

23. The apparatus of claim 22 wherein said variable attenuating means includes a potentiometer.

24. The apparatus of claim 21 including bump duration timer means for controlling the duration of the bump.

25. The apparatus of claim 24 wherein said bump duration timer means includes mans for adjusting the duration time of the bump.

26. The apparatus of claim 11 wherein said decoder has an inhibit input for receiving the control output signal from said analog comparator means and inhibiting the output of said decoder in response thereto, and further comprising means for impressing a nominal reference signal on the reference signal input of said analog comparator means when the output of the decoder is thusly inhibited.

27. The apparatus of claim 26 wherein said analog comparator means produces a second control signal in response to a predetermined relationship between the output signal of the transducer and the nominal reference signal, and said second control signal starts said bump duration timer means.

28. The apparatus of claim 11 including means for starting the bump duration timer upon the press pressure dropping to a nominal pressure common to each bump step.

29. The apparatus of claim 28 wherein said means for starting the bump duration timer includes means for supplying a nominal reference signal indicative of such nominal pressure to said analog comparator means in response to said control signal, said analog comparator means then comparing the output signal of the transducer with said nominal reference signal and upon a predetermined relationship therebetween supplying a start signal to said timer means.

30. The apparatus of claim 20 wherein said means for selectively determining includes programmable mans for providing command signals respectively indicative of the reference signals to be supplied to said analog comparator means for sequential bumps and means for selecting and supplying a reference signal to said analog comparator means in accordance with a command signal provided by said programmable means.

31. The apparatus of claim 30 wherein said analog comparator means has a reference signal input and said means for selecting and supplying includes decoder means having an output connected to said reference signal input and a number of inputs selectively connectable to said output in accordance with the command signals, and said means for producing includes reference signal generators connected respectively to the inputs of said decoder means.

32. The apparatus of claim 30 wherein said means for selectively determining further includes bump step counter means for counting the number of bumps that have been performed and providing a signal representative of such number to said programmable means so that when said counter means moves to the next sequential step, said programmable means will provide to said means for selecting and supplying the command signal dictating the reference signal for the next sequential bump.

33. The apparatus of claim 30 including cure pressure control means for controlling the pressure of the press during cure.

34. The apparatus of claim 33 wherein said programmable means produces a command signal indicative of one of the reference signals corresponding to a desired cure pressure, said means for selectively determining further includes means for supplying said command signal to said means for selecting and supplying after the last prescribed bump has been performed whereupon such one of the reference signals is supplied to said analog comparator means, and said cure pressure control means includes means responsive to the control signal produced by said analog comparator means upon a predetermined relationship between the output signal and such one of said reference signals for directing the press to hold press pressure.

35. The apparatus of claim 30 wherein said programmable means includes means for reading a program memory device and providing the command signals in accordance with the program information carried by said program memory device.

36. The apparatus of claim 35 wherein said program memory device is of the non-volatile type having program information fixedly encoded therein.

37. The apparatus of claim 36 wherein said program memory device is a printed circuit card.

38. The apparatus of claim 16, wherein said program memory device includes a printed circuit card and said reader means includes decoder means for deciphering the printed circuit card.

39. The apparatus of claim 38 including step counter means for providing a count signal to said reader means representative of the number of bumps that have been performed so that when said counter means advances upon performance of a bump, said reader means will provide to said means for selecting and supplying the command signal dictating the reference signal to be selected and compared with the output signal of said transducer for the next sequential bump.

40. The apparatus of claim 39 wherein said programmable means produces a count signal representative of the total number of bumps to be performed and further including bump step comparison means for comparing the signal from said step counter means with said count signal and upon a predetermined relationship therebetween, supplying a signal to said means for directing to inhibit inhibiting the performance of any further bumps.

41. The apparatus of claim 40 including cure pressure control means for receiving the signal from said bump step comparison means and in response thereto, controlling the pressure of the press during cure.

42. The apparatus of claim 41 wherein said programmable means produces a command signal dictating the selection of a cure pressure reference signal indicative of cure pressure and supplies it to the means for selecting and supplying in response to the signal from said bump step comparator means whereupon the reference sigal indicative of cure pressure is supplied to the analog comparator means, and said cure pressure control means includes means responsive to the control signal produced by said comparison means upon a predetermined relationship between the output signal of the transducer and the reference signal indicative of cure pressure for directing the press to hold pressure.

* * * * *